US012793265B2

(12) United States Patent
Han et al.

(10) Patent No.: US 12,793,265 B2
(45) Date of Patent: Nov. 10, 2026

(54) ELECTRONIC DEVICE AND A CONTROL METHOD THEREOF FOR ADJUSTING CAMERA CALIBRATION INFORMATION BASED ON PHYSICAL QUANTITY COMPARISON TO ESTIMATE DISTANCE FROM IDENTIFIED OBJECT TO CAMERA

(71) Applicants: HYUNDAI MOTOR COMPANY, Seoul (KR); KIA CORPORATION, Seoul (KR)

(72) Inventors: Ji Hee Han, Seoul (KR); Jung Phil Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 266 days.

(21) Appl. No.: 18/505,747

(22) Filed: Nov. 9, 2023

(65) Prior Publication Data

US 2025/0045959 A1 Feb. 6, 2025

(30) Foreign Application Priority Data

Aug. 3, 2023 (KR) ........................ 10-2023-0101656

(51) Int. Cl.

*G06T 7/80* (2017.01)
*G06T 7/20* (2017.01)
*G06V 20/58* (2022.01)

(52) U.S. Cl.

CPC .................. *G06T 7/80* (2017.01); *G06T 7/20* (2013.01); *G06V 20/58* (2022.01); *G06T 2207/20081* (2013.01)

(58) Field of Classification Search

CPC ... G06T 7/80; G06T 7/20; G06T 2207/20081; G06T 2207/20084; G06T 7/246;

(Continued)

(56) References Cited

U.S. PATENT DOCUMENTS 8,509,982 B2 8/2013 Montemerlo et al.
8,634,980 B1 1/2014 Urmson et al.

(Continued)

FOREIGN PATENT DOCUMENTS

CN 111862236 A * 10/2020 ............. G06F 18/24
CN 113177508 A * 7/2021 ............. G06V 20/54

(Continued)

*Primary Examiner* — Emily C Terrell
*Assistant Examiner* — Julia Z. Yao
(74) *Attorney, Agent, or Firm* — Lempia Summerfield Katz LLC

(57) ABSTRACT

An electronic includes a communication device that receives object information of a target captured by a camera and recognized based on a deep learning model. The electronic device also includes a memory storing calibration information of the camera and physical information of the target. The electronic device additionally includes a processor configured to determine movement information of the target based on the object information. The processor is also configured to determine a first physical quantity to the target based on the movement information and the calibration information. The processor is further configured to determine a second physical quantity to the target based on the movement information and the physical information. The processor is additionally configured to compare the first physical quantity with the second physical quantity to determine whether to adjust the calibration information.

8 Claims, 12 Drawing Sheets

(58) Field of Classification Search
CPC ... G06T 7/50; G06T 7/60; G06T 2207/30252; G06T 2210/12; G06V 20/58; G06V 10/82; G06V 10/25
See application file for complete search history.

(56) References Cited

U.S. PATENT DOCUMENTS

| | | | | |
|---|---|---|---|---|
| 8,660,734 B2 | | 2/2014 | Zhu et al. | |
| 8,688,306 B1 | | 4/2014 | Nemec et al. | |
| 8,825,264 B2 | | 9/2014 | Montemerlo et al. | |
| 8,874,305 B2 | | 10/2014 | Dolgov et al. | |
| 8,948,955 B2 | | 2/2015 | Zhu et al. | |
| 8,965,621 B1 | | 2/2015 | Urmson et al. | |
| 9,120,484 B1 | | 9/2015 | Ferguson et al. | |
| 9,122,948 B1 | | 9/2015 | Zhu et al. | |
| 9,268,332 B2 | | 2/2016 | Montemerlo et al. | |
| 9,658,620 B1 | | 5/2017 | Urmson et al. | |
| 9,679,191 B1 | | 6/2017 | Zhu et al. | |
| 9,911,030 B1 | | 3/2018 | Zhu et al. | |
| 10,198,619 B1 | | 2/2019 | Zhu et al. | |
| 10,372,129 B1 | | 8/2019 | Urmson et al. | |
| 10,572,717 B1 | | 2/2020 | Zhu et al. | |
| 11,010,998 B1 | | 5/2021 | Dolgov et al. | |
| 11,106,893 B1 | | 8/2021 | Zhu et al. | |
| 11,187,793 B1 | * | 11/2021 | Liu | G05D 1/0214 |
| 11,287,817 B1 | | 3/2022 | Urmson et al. | |
| 11,720,101 B1 | | 8/2023 | Dolgov et al. | |
| 11,747,809 B1 | | 9/2023 | Zhu et al. | |
| 2012/0083959 A1 | | 4/2012 | Dolgov et al. | |
| 2012/0083960 A1 | | 4/2012 | Zhu | |
| 2012/0083964 A1 | | 4/2012 | Montemerlo et al. | |
| 2013/0297140 A1 | | 11/2013 | Montemerlo et al. | |
| 2014/0136045 A1 | | 5/2014 | Zhu et al. | |
| 2014/0324268 A1 | | 10/2014 | Montemerlo et al. | |
| 2017/0021829 A1 | | 1/2017 | Nishimura | |
| 2019/0050634 A1 | * | 2/2019 | Nerayoff | G06F 18/22 |
| 2019/0242693 A1 | * | 8/2019 | Noda | G06V 20/00 |
| 2019/0285432 A1 | * | 9/2019 | Sakaguchi | G07C 5/06 |
| 2019/0376809 A1 | * | 12/2019 | Hanniel | G05D 1/028 |
| 2022/0375129 A1 | * | 11/2022 | Wang | G06T 7/80 |
| 2022/0383529 A1 | * | 12/2022 | Lee | G06T 7/536 |
| 2025/0037311 A1 | * | 1/2025 | Mukherjee | B60W 50/14 |

FOREIGN PATENT DOCUMENTS

| | | | | | |
|---|---|---|---|---|---|
| JP | 2009163506 A | * | 7/2009 | | |
| KR | 20130132790 A | | 12/2013 | | |
| KR | 20170012034 A | | 2/2017 | | |
| RU | 2470376 C2 | * | 12/2012 | | |
| WO | WO-2021106510 A1 | * | 6/2021 | | H04N 23/90 |

* cited by examiner

ELECTRONIC DEVICE AND A CONTROL METHOD THEREOF FOR ADJUSTING CAMERA CALIBRATION INFORMATION BASED ON PHYSICAL QUANTITY COMPARISON TO ESTIMATE DISTANCE FROM IDENTIFIED OBJECT TO CAMERA

CROSS-REFERENCE TO RELATED APPLICATION

This application claims the benefit of and priority to Korean Patent Application No. 10-2023-0101656, filed in the Korean Intellectual Property Office on Aug. 3, 2023, the entire contents of which are hereby incorporated herein by reference.

TECHNICAL FIELD

The present disclosure relates to a method for adjusting calibration information to estimate a distance to an object recognized from a camera, and more particularly, relates to a method for using deep learning-based two-dimensional (2D) bounding box information and keypoint information when recognizing an object of interest using a camera image.

BACKGROUND

A process of recognizing an object using a camera includes a step of inputting an image received through the camera to an image processing controller used in a vehicle and executing logic for autonomous driving image recognition in an image processing controller, and a step of receiving a result value of an image recognition deep learning model and processing the result value as a signal for vehicle control.

In the step of receiving the result value of the image recognition deep learning model and processing the result value as the signal for vehicle control, camera calibration information may be used to estimate a distance value in a real three-dimensional (3D) system based on information in the image obtained by means of the camera. The calibration information may be a parameter value indicating a relationship between the image and the real 3D system that may be obtained in the end of line (EOL) vehicle production stage for a general mass-produced vehicle.

However, a position of the camera mounted on the vehicle or an angle at which the camera is mounted may vary due to an internal factor and an external factor. When an error occurs in a calibration value, an error occurs in a distance and a speed calculated for a target object.

The statements in this BACKGROUND section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides an electronic device for obtaining object information of a target captured by a camera and recognized based on a deep learning model, determining movement information of the target based on the object information, and determining whether to adjust calibration information depending on the movement information of the target and a control method thereof.

Another aspect of the present disclosure provides an electronic device for actively recognizing and compensating for slight warping of a camera, where the camera may be slightly warped while a vehicle is traveling, and providing an autonomous driving system with reliable vehicle control data and a control method thereof.

The technical problems to be solved by the present disclosure are not limited to the aforementioned technical problems. Other technical problems not mentioned herein should be clearly understood from the following description by those having ordinary skill in the art to which the disclosure pertains.

According to an aspect of the present disclosure, an electronic device is provided. The electronic device may include a communication device configured to receive object information of a target captured by a camera and recognized based on a deep learning model. The electronic device may also include a memory storing calibration information of the camera and physical information of the target. The electronic device also includes a processor. The processor is configured to determine movement information of the target based on the object information. The processor is also configured to determine a first physical quantity to the target based on the movement information and the calibration information. The processor is further configured to determine a second physical quantity to the target based on the movement information and the physical information. The processor is additionally configured to compare the first physical quantity with the second physical quantity to determine whether to adjust the calibration information.

The processor may, when the target is determined as a dynamic object based on the movement information, determine a distance to a lower end of the center of a bounding box included in the object information as the first physical quantity.

The processor may, when the target is determined as a dynamic object based on the movement information, determine the second physical quantity as a ratio between actual width information of the target, the actual width information being included in the physical information, and width information on an image of the target, the width information being included in the object information.

The processor may divide i) a value obtained by multiplying the actual width information by a focal distance of the camera by ii) the width information on the image to determine the second physical quantity.

The processor may, when the target is determined as a static object based on the movement information, determine the first physical quantity using an amount of movement of a keypoint included in the object information.

The processor may receive a current speed through the communication device when the target is determined as a static object based on the movement information, and may determine the current speed as the second physical quantity.

The processor may adjust the calibration information in response to determining that a difference between the first physical quantity and the second physical quantity is greater than or equal to a predetermined reference value.

The processor may determine an average value of the first physical quantities and an average value of the second physical quantities during a predetermined reference time and may adjust the calibration information based on determining that a difference between the average value of the first physical quantities and the average value of the second physical quantities is greater than or equal to a predetermined reference value.

According to another aspect of the present disclosure, a method of controlling an electronic device is provided. The method may include receiving object information of a target captured by a camera and recognized based on a deep learning model. The method may also include determining movement information of the target based on the object information. The method may additionally include determining a first physical quantity to the target based on the movement information and calibration information of the target. The method may further include determining a second physical quantity to the target based on the movement information and physical information of the target. The method may further still include comparing the first physical quantity with the second physical quantity to determine whether to adjust the calibration information.

Determining the first physical quantity may include, when the target is determined as a dynamic object based on the movement information, determining a distance to a lower end of the center of a bounding box included in the object information as the first physical quantity.

Determining the second physical quantity may include, when the target is determined as a dynamic object based on the movement information, determining the second physical information at a ratio between actual width information of the target, the actual width information being included in the physical information, and width information on an image of the target, the width information being included in the object information.

Determining the second physical quantity may include dividing i) a value obtained by multiplying the actual width information by a focal distance of the camera by ii) the width information on the image to determine the second physical quantity.

Determining the first physical quantity may include, when the target is determined as a static object based on the movement information, determining the first physical quantity using an amount of movement of a keypoint included in the object information.

Determining the second physical quantity may include receiving a current speed through a communication device when the target is determined as a static object based on the movement information, and determining the current speed as the second physical quantity.

Determining whether to adjust the calibration information may include adjusting the calibration information in response to determining that a difference between the first physical quantity and the second physical quantity is greater than or equal to a predetermined reference value.

Determining whether to adjust the calibration information may include determining an average value of the first physical quantities and an average value of the second physical quantities during a predetermined reference time and adjusting the calibration information based on that a difference between the average value of the first physical quantities and the average value of the second physical quantities is greater than or equal to a predetermined reference value.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
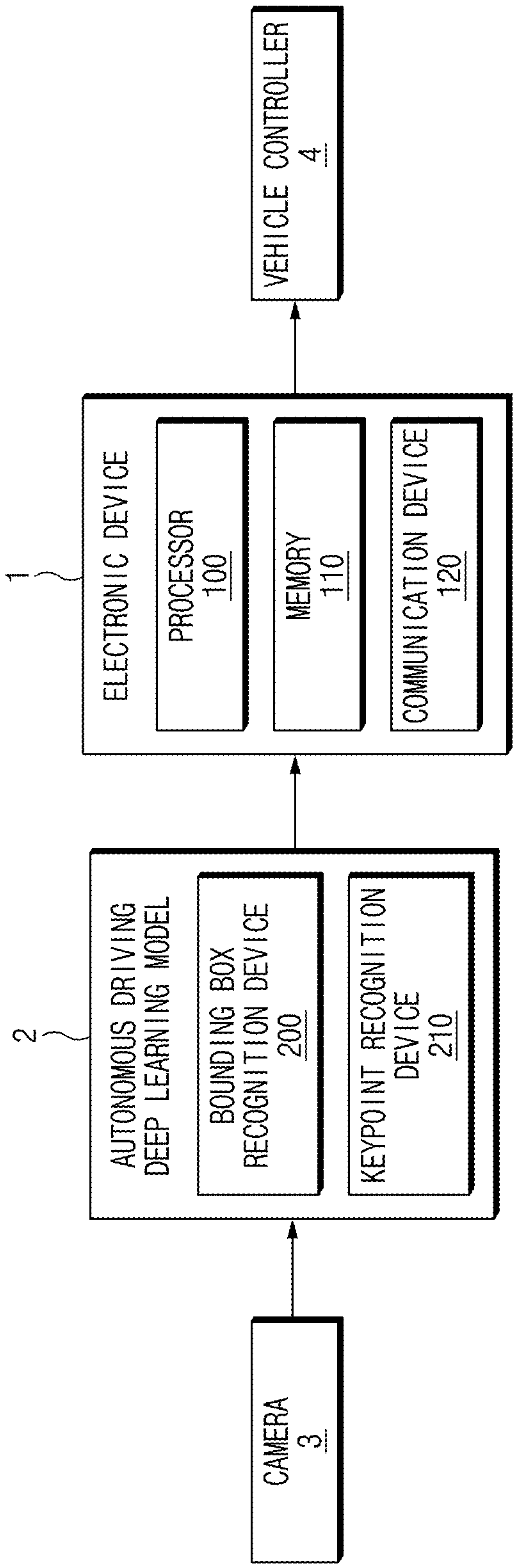
FIG. 1 is a drawing illustrating a control block diagram including an electronic device, according to an embodiment.

It should be appreciated that various embodiments of the present disclosure and the terms used therein are not intended to limit the technological features set forth herein to particular embodiments and may include various changes, equivalents, or replacements for a corresponding embodiment.

With regard to the description of the drawings, similar reference numerals may be used to refer to similar or related elements.

A singular form of a noun corresponding to an item may include one item or a plurality of items, unless the relevant context clearly indicates otherwise.

As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions.

Such terms as "1st" and "2nd," or "first" and "second" may be used to simply distinguish a corresponding component from another, and does not limit the components in any other aspect (e.g., importance or order).

It should be understood that if any (e.g., a first) component is referred to, with or without the term "operatively" or "communicatively", as "coupled with," "coupled to," "connected with," or "connected to" another (e.g., a second) component, this means that the element may be coupled with the other element directly (e.g., by one or more wires), wirelessly, or via a third component.

The terms "comprises", "includes", etc. specify the presence of stated features, numbers, steps, operations, components, parts, or a combination thereof, but do not preclude the presence or addition of one or more other features, numbers, steps, operations, components, parts, or a combination thereof.

When one component is "connected," "coupled," "supported", or "touched" to another component, this includes the case in which the components are directly connected, coupled, supported, or touched to each other as well as the case in which the components are indirectly connected, coupled, supported, or touched to each other through a third component.

When one component is located "on" another component, this includes the case in which another component is present between the two components as well as the case in which the one component is adjacent to the other component.

The term "and/or" includes a combination of a plurality of related described components or any of the plurality of related described components.

When a component, device, element, or the like of the present disclosure is described as having a purpose or performing an operation, function, or the like, the component, device, or element should be considered herein as being "configured to" meet that purpose or perform that operation or function.

Hereinafter, operation principles and embodiments of the present disclosure are described with reference to the accompanying drawings.

FIG. 1 is a drawing illustrating an electronic device, according to an embodiment.

Referring to FIG. 1, when an autonomous driving deep learning model 2 receives an image of a target 10 from a camera 3 and derives object information of the target 10, an electronic device 1 according to an embodiment may receive the object information of the target 10. The electronic device 1 may determine movement information of the target 10 based on the object information of the target 10. The electronic device 1 may determine a distance to the target 10 based on the determined movement information, calibration information, and physical information.

The autonomous driving deep learning model 2 may receive an image from the camera 3 and may derive the object information of the target 10 from the received image. The autonomous driving deep learning model 2 may transmit the object information to the electronic device 1. The autonomous driving deep learning model 2 may include an artificial neural network trained by means of a computer vision-based learning algorithm. An example of a learning algorithm may be, but is not limited to, supervised learning, unsupervised learning, semi-supervised learning, or reinforcement learning.

The artificial neural network may include a plurality of neural network layers. Each of the plurality of neural network layers may have a plurality of weight values. Each of the plurality of neural network layers may perform neural network operation based on an operation result of a previous layer and operation among the plurality of weight values. The plurality of weight values of the plurality of neural network layers may be optimized by training of the artificial intelligence model. For example, the plurality of weight values may be updated such that a loss value or a cost value obtained by the artificial intelligence model during the training process is reduced or minimized.

The artificial neural network may include a deep neural network (DNN). The artificial neural network may include, for example, but is not limited to, a convolutional neural network (CNN), a deep neural network (DNN), a recurrent neural network (RNN), a restricted Boltzmann machine (RMB), a deep belief network (DBN), a bidirectional recurrent deep neural network (BRDNN), deep Q-networks, or the like.

The autonomous driving deep learning model 2 may receive a road image including the target 10, such as a vehicle, from an external device, such as the camera 3. The autonomous driving deep learning model 2 may include a bounding box recognition device 200 and a keypoint recognition device 210 to analyze the road image by means of the artificial neural network. The bounding box recognition device 200 may specify a position of the target 10 included in the road image and may display a border of the specified target 10 as a predetermined type of box. The keypoint recognition device 210 may recognize a keypoint, such as a road marker, to calculate a speed of the vehicle from an object fixed on the road.

The electronic device 1 according to an embodiment may determine a distance to the target 10 using two different schemes. The distance determined using the two different schemes may be expressed as a first physical quantity and a second physical quantity. The first physical quantity may refer to the distance to the target 10 determined based on movement information of the target 10 and calibration information of the camera 3. The second physical quantity may refer to the distance to the target 10 determined based on movement information of the target 10 and physical information of the target 10.

The electronic device 1 may determine whether there is a need to adjust the calibration information based on an error between the first physical quantity and the second physical quantity. When it is determined that there is the need to adjust the calibration information, the electronic device 1 may adjust the calibration information and may transmit vehicle control data for vehicle control to a vehicle controller 4.

The electronic device 1 according to an embodiment may include a processor 100, a memory 110, and a communication device 120. It should be apparent that the electronic device 1 may further include additional components necessary for implementation of the present disclosure. Components of the electronic device 1, according to an embodiment, are described in more detail below with reference to the FIG. 2.

Figure 2:
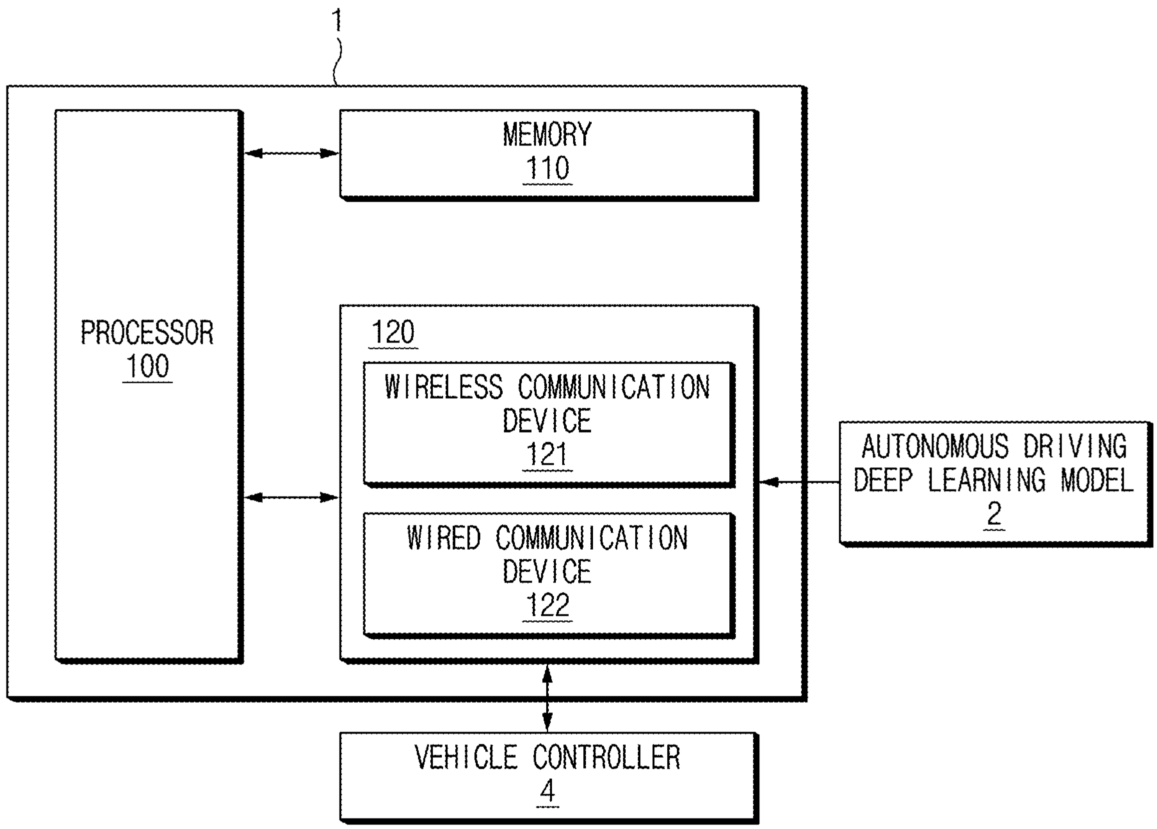
FIG. 2 is a drawing illustrating a control block diagram of an electronic device, according to an embodiment.

FIG. 2 is a drawing illustrating a control block diagram of the electronic device 1, according to an embodiment.

Referring to FIG. 2, the electronic device 1 may include at least one processor 100, a memory 110, and a communication device 120. The electronic device 1 may communicate with an autonomous driving deep learning model 2 through the communication device 120 to determine whether to adjust calibration information. The electronic device 1 may also communicate with a vehicle controller 4 through the communication device 120 to adjust the calibration information and transmit vehicle control data.

The electronic device 1 according to an embodiment may refer to all electronic devices, each of which includes the processor 100 and the memory 110, and may include, for example, a server device, a personal computer, a terminal, a portable telephone, a smartphone, a handheld device, and a wearable device. The above-mentioned electronic devices may be loaded into a vehicle to operate. Components of the electronic device 1, according to an embodiment, are described in more detail below.

The memory 110 may store various pieces of information necessary for driving of the electronic device 1. For example, the memory 110 may store an operating system and a program necessary for driving of the electronic device 1. Additionally, or alternatively, the memory 110 may store data necessary for driving of the electronic device 1. For example, the memory 110 may store calibration information of a camera 3 for determining a distance to a target 10 and physical information of the target 10.

The memory 110 may include a volatile memory, such as a state random access memory (SRAM) or a dynamic random access memory (DRAM), for temporarily storing data. Furthermore, the memory 110 may include a non-volatile memory, such as a read only memory (ROM), an erasable programmable ROM (EPROM), or an electrically erasable programmable ROM (EEPROM), for storing data persistently (e.g., for a long time).

The communication device 120 may include a wired communication device 122 and a wireless communication device 121 to communicate with the autonomous driving deep learning model 2 and the vehicle controller 4.

The wired communication device 122 may access a wired communication network and may communicate with an external device over the wired communication network. For example, the wired communication device 122 may access the wired communication network through an Ethernet (IEEE 802.3 technical standard). As another example, the wired communication device 122 may access the wired communication network through controller area network (CAN) communication. The wired communication device 122 may transmit and receive data with external devices over the wired communication network.

The wireless communication device 121 may include at least one of a short-range communication module and/or a long-range communication module.

The short-range communication module may communicate with the external device adjacent to the electronic device 1 using a short-range communication method. The short-range communication module may use one of Bluetooth, Bluetooth low energy, Infrared data association (IrDA), ZigBee, wireless-fidelity (Wi-Fi), Wi-Fi Direct, ultra wideband (UWB), near field communication (NFC), and/or the like.

The long-range communication module may include a communication module for performing various types of long-range communication and may include a mobile communication device. The mobile communication device may transmit wireless signals to, and may receive wireless signals from, at least one of a base station, an external terminal, or the other external devices on a mobile communication network. Furthermore, the long-range communication module may communicate with the external device, such as another electronic device 1, through a surrounding access point (AP). The AP may connect a local area network (LAN) connected with the electronic device 1 with a wide area network (WAN) connected with a communication server. Thus, the electronic device 1 may be connected with the communication server over the WAN to communicate with the communication server.

The processor 100 may output control signals to perform the overall control of the electronic device 1. The processor 100 may include one central processing unit (CPU) or a plurality of CPUs and a graphics processing unit (GPU). The processor 100 may be implemented as an array of a plurality of logic gates and/or may be implemented as a combination of the universal microprocessor 100 and the memory 110 that stores computer-readable instructions (e.g., a program) executable by the microprocessor 100.

The processor 100 may control the above-mentioned components, thus determining a first physical quantity and a second physical quantity to determine whether to adjust calibration information and determining that there is a need to adjust the calibration information when an error between the first physical quantity and the second physical quantity is greater than or equal to a reference value. In an embodiment, the processor 100 may determine movement information of the target 10 based on object information. The processor 100 may determine the first physical quantity to the target 10 based on the movement information and the calibration information. The processor 100 may determine the second physical quantity to the target 10 based on the movement information and the physical information. The processor 100 may compare the first physical quantity with the second physical quantity to determine whether to adjust calibration information.

The processor 100 may determine a distance to a lower end of the center of a bounding box included in the object information as the first physical quantity when the movement information indicates a dynamic object. The processor 100 may determine the second physical quantity as a ratio between actual width information of the target 10, which is included in the physical information, and width information on an image of the target 10, which is included in the object information. The processor 100 may divide a value obtained by multiplying the actual width information by a focal distance of the camera 3 by the width information on the image to determine the second physical quantity.

The processor 100 may determine the first physical quantity using an amount of movement of a keypoint included in the object information when the movement information indicates a static object. The processor 100 may receive a current speed through the communication device 120 and may determine the second physical quantity based on the current speed when the movement information indicates the static object.

The processor 100 may adjust the calibration information based on determining that a difference between the first physical quantity and the second physical quantity is greater than or equal to a predetermined reference value. The processor 100 may determine an average value of the first physical quantities and an average value of the second physical quantities during a predetermined reference time. The processor 100 may adjust the calibration information based on determining that a difference between the average value of the first physical quantities and the average value of the second physical quantities is greater than or equal to the reference value.

Thus, the electronic device 1 according to an embodiment may determine whether to adjust the calibration information based on the calibration information of the camera 3 and the physical information of the target 10, thus reducing a time and effort required for calibration of the separate camera 3 after a vehicle is manufactured.

Hereinafter, process of determining whether to adjust the calibration information by means of the processor 100 included in the electronic device 1, according to an embodiment, is described in more detail below.

Figure 3:
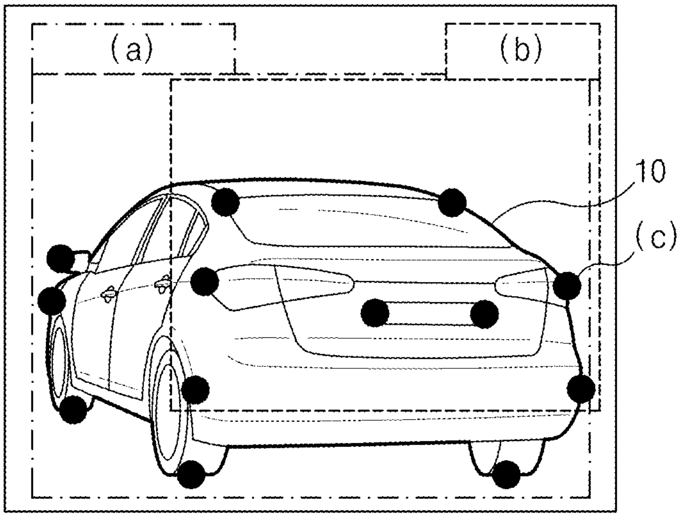
FIG. 3 is a drawing illustrating a bounding box used in an electronic device, according to an embodiment.

FIG. 3 is a drawing illustrating a bounding box used in an electronic device, according to an embodiment.

Referring to FIG. 3, the electronic device 1 according to an embodiment may receive object information of a target 10 recognized from the autonomous driving deep learning model 2. The object information of the target 10 may include information in which the target 10 included in an image captured by the camera 3 is analyzed by image processing. For example, the object information of the target 10 may include type information (e.g., vehicle type information and part information of a vehicle) of the target 10. The type information may be represented as a class. The object information of the target 10 may also include position information (e.g., two-dimensional (2D) bounding box information) of the target 10.

The vehicle type information, that may be included in the type information of the target 10, may include specification information of the vehicle. For example, the vehicle type information may include a sedan, a sport utility vehicle (SUV), a coupe, a hatchback, a wagon, a convertible, a limousine, and/or the like. The part information of the vehicle, that may be included in the type information of the target 10, may include information indicating whether the recognized target 10 is an entire vehicle or a part of the vehicle. For example, the part information of the vehicle may include the entire vehicle, a bumper of the vehicle, tail lamps of the vehicle, a license plate of the vehicle, and/or the like.

The autonomous driving deep learning model 2 may obtain a plurality of points c by means of edge detection to obtain the vehicle type information of the target 10. For example, as shown in FIG. 3, the autonomous driving deep learning model 2 may obtain positions of end portions of both tail lamps of the vehicle by means of edge detection. The autonomous driving deep learning model 2 may also obtain positions of left and right end portions of the bumper. Furthermore, the autonomous driving deep learning model 2 may obtain positions of end portions of both the side mirrors by means of edge detection and may obtain positions of end portions of both the fenders. As a result, the autonomous driving deep learning model 2 may determine a vehicle type of the target 10 depending on a relative distance of positions of the plurality of obtained points c.

The autonomous driving deep learning model 2 may generate a bounding box to obtain part information of the vehicle in the type information of the target 10 and position information of the target 10.

The bounding box may be generated in an image recognition process. The bounding box may comprise a box shape with a minimum size, which includes one object. The bounding box may be generated in all or a part of the target 10. As shown in FIG. 3, a bounding box a including the entire vehicle and a bounding box including a part b of the vehicle may be generated.

The electronic device 1 may receive the type information of the target 10 (e.g., vehicle type information and part information of the vehicle) and the position information (e.g., the 2D bounding box information) of the target 10 from the autonomous driving deep learning model 2. The electronic device 1 may determine a second physical quantity to the target 10 based on the received type information of the target 10 and the received position information of the target 10. The electronic device 1 may compare a first physical quantity determined based on calibration information of the camera 3 with the second physical quantity to determine whether to adjust the calibration information.

In an embodiment, the object information of the target 10 may include movement class information for determining movement information of the target 10. The movement class information may include information regarding whether the object 10, the image of which is analyzed, is a moving object or an object fixed to the road. For example, a vehicle, a pedestrian, a bicycle, and/or the like may be indicated as dynamic objects in the movement class information On the other hand, a road sign, a road marker, a building, and/or the like may be indicated as static objects in the movement class information.

Thus, the electronic device 1 may determine movement information of the target 10 based on the object information of the target 10. The electronic device 1 may determine whether to adjust calibration information in a different manner depending on whether the target 10 is a dynamic object or a static object.

For example, when it is determined that the target 10 is a dynamic object based on the movement information of the target 10, the processor 100 may determine a distance to a lower end of the center of the bounding box as the first physical quantity using the calibration information. The processor 100 may determine the second physical quantity using a ratio between actual width information of the target 10 and width information on an image.

On the other hand, when it is determined that the target 10 is a static object based on the movement information of the target 10, the processor 100 may determine the first physical quantity using the amount of movement of a keypoint. The processor 100 may determine the second physical quantity based on the current speed received through the communication device 120.

As such, the electronic device 1 according to an embodiment may determine whether to adjust calibration information in a different manner depending on whether the target 10 included in the image is a moving object or a stopped object. Thus, as the electronic device 1 may determine whether to adjust calibration information based on the stopped object although there is no moving object in the image captured by the camera 3, the accuracy and reliability of determining whether to adjust the calibration information is improved.

An embodiment of determining the first physical quantity and the second physical quantity based on determining that the target 10 is a dynamic object is described in more detail below with reference to FIGS. 4-7.

Figure 4:
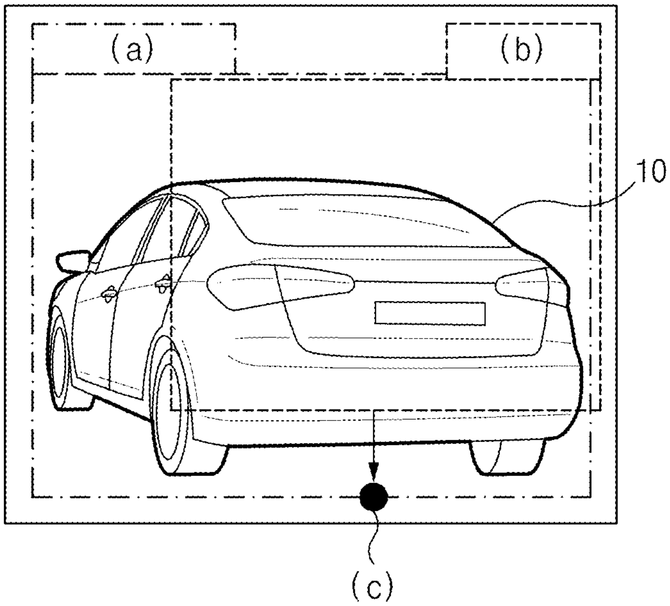
FIG. 4 is a drawing illustrating a reference point of a bounding box in an electronic device, according to an embodiment.

FIG. 4 is a drawing illustrating a reference point of a bounding box in an electronic device, according to an embodiment.

Referring to FIG. 4, the processor 100 of the electronic device 1 according to an embodiment may set a reference point for determining a distance to a target 10 based on determining that the target 10 is a dynamic object. The processor 100 may use calibration information to determine a first distance to the target 10. The calibration information may refer to a relationship value between a world coordinate system and an image coordinate system by the camera 3.

In an embodiment, because the world coordinate system three-dimensionally has a (x, y, z) value, whereas the image coordinate system by the camera 3 two-dimensionally has a (u, v) value, the processor 100 may adjust a z value to "0" such that the world coordinate system and the image coordinate system are identical to each other. For example, the processor 100 may determine a point where the z value of the three-dimensional (3D) world coordinate system becomes "0" on an image. In an embodiment, the processor 100 may determine the point where the z value of the 3D world coordinate system becomes "0" as a point c, such as the point c of FIG. 4, that is connected from a lower end of the center of a bounding box b including a vehicle bumper to a lower end of the center of a bounding box a including the entire vehicle.

As a result, the processor 100 may set Z to "0" based on a model for a pinhole camera 3. expressed as Equation 1 below. The processor 100 may obtain an (X, Y) value to determine a distance to the point c assumed as the shortest distance to the target 10 as a first physical quantity.

[Equation 1]

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \times \begin{bmatrix} R_{11} & R_{12} & R_{13} & T_1 \\ R_{21} & R_{22} & R_{23} & T_2 \\ R_{31} & R_{32} & R_{33} & T_2 \end{bmatrix} \times \begin{bmatrix} X \\ Y \\ Z \\ 1 \end{bmatrix}$$

Thus, the processor 100 may compare the above-mentioned first physical quantity with a second physical quantity described with reference to FIGS. 5-7 to determine whether to adjust 10 calibration information.

Figure 5:
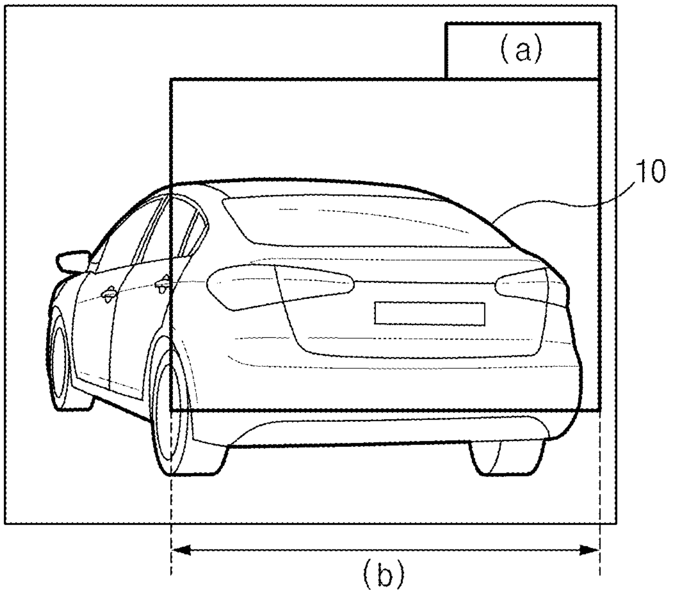
FIG. 5 is a drawing illustrating width information on an image used in an electronic device, according to an embodiment.

FIG. 5 is a drawing illustrating width information on an image used in an electronic device, according to an embodiment.

Referring to 5, the processor 100 of the electronic device 1 according to an embodiment may receive information about a bounding box a corresponding to a bumper of a vehicle from the autonomous driving deep learning model 2. The processor 100 may determine width information b included in the information about the bounding box a corresponding to the bumper of the vehicle as width information on an image of the vehicle.

The processor 100 may perform arithmetic operation on the width information on the image of the vehicle and physical information of an object, stored in the memory 110, to obtain a second physical quantity which is a distance to the object.

In the embodiment of FIG. 5, the width information on the image of the vehicle is obtained. However, in another embodiment, height information on the image of the vehicle may be obtained. In other words, the processor 100 may determine height information of the bounding box a, included in the information about the bounding box a corresponding to the bumper of the vehicle, as the height information on the image of the vehicle. The processor 100 may perform arithmetic operation on the height information on the image of the vehicle and physical information of the object, stored in the memory 110, to obtain the second physical quantity which is the distance to the object.

Figure 6:
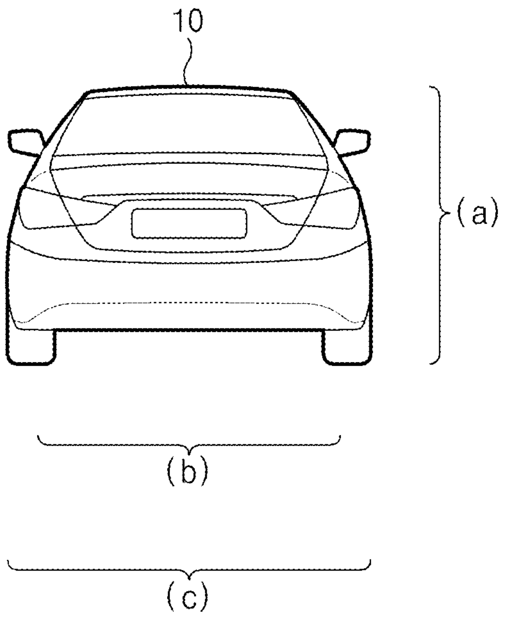
FIG. 6 is a drawing illustrating physical information of an object stored in a memory of an electronic device, according to an embodiment.

FIG. 6 is a drawing illustrating physical information of an object stored in a memory of an electronic device, according to an embodiment.

The memory 110 of the electronic device 1 according to an embodiment may store information of a target 10 recognized by the autonomous driving deep learning model 2. For example, the physical information of the target 10 may include specification information about a vehicle. The specification information may include an overall height a included in height information of the vehicle, a thread b and an overall width c included in width information, an overall length included in length information, a wheel base included in wheel base information, and/or the like.

As described above, the processor 100 of the electronic device 1 according to an embodiment may calculate a first physical quantity based on calibration information of the camera 3 and may calculate a second physical quantity based on the physical information of the target 10.

The processor 100 may calculate the specification information of the vehicle, stored in the memory 110, and specification information of the vehicle, measured on an image, depending on a rate to calculate the second physical quantity. A process of determining the second physical information, according to an embodiment, is described in more detail below with reference to the FIG. 7.

Figure 7:
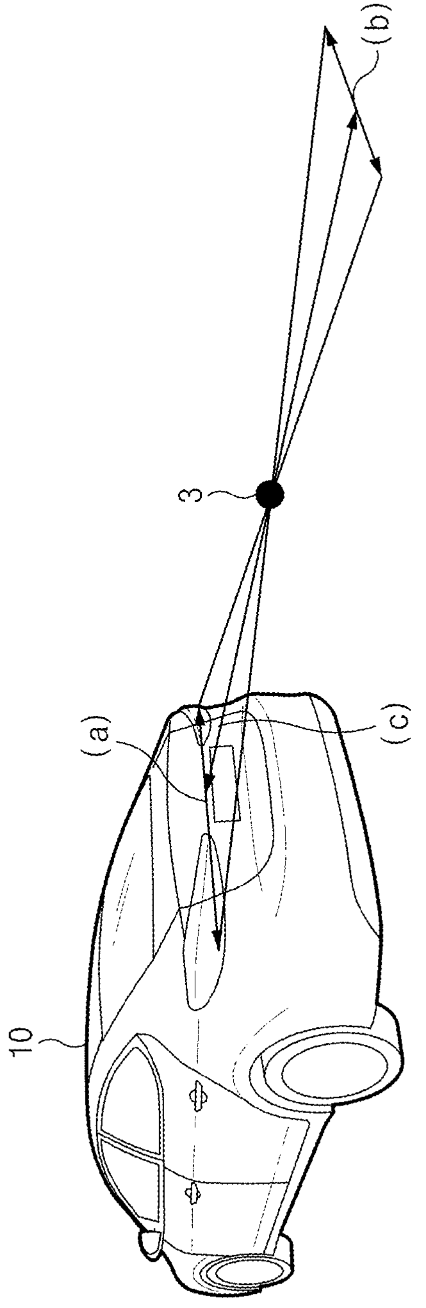
FIG. 7 is a diagram illustrating a method for calculating a distance to an object based on a focal distance in an electronic device, according to an embodiment.

FIG. 7 is a diagram illustrating a method for calculating a distance to an object based on a focal distance in an electronic device, according to an embodiment.

Referring to FIG. 7, the processor 100 may divide a value obtained by multiplying i) an actual vehicle width c previously stored in the memory 110 by a focal distance of the camera 3 by ii) a vehicle width on an image to determine a second physical quantity.

In detail, the processor 100 may determine the second physical quantity based on Equation 2 below.

$w$ (the vehicle width on the image):$W$ (the actual vehicle width)=$f$ (the focal distance on the camera 3):$X$ (the second physical quantity) [Equation 2]

As described above with reference to FIG. 5, the processor 100 may determine width information included in bounding box information corresponding to the bumper of a vehicle as w (the width information on the image) b of the vehicle.

The processor 100 may obtain width information of the vehicle from specification information of the vehicle, stored in the memory 110. The processor 100 may determine the width information of the vehicle as W (the actual vehicle width) a. The processor 100 may substitute the focal distance of the camera 3, stored in the memory 110, into Equation 2 above to calculate the second physical quantity.

In other words, the processor 100 may modify Equation 2 above to determine a value obtained by dividing a value, obtained by multiplying W (the actual vehicle width) by f (the focal distance of the camera 3), by w (the vehicle width on the image) as the second physical quantity.

As a result, the processor 100 may compare the first physical quantity determined in FIG. 4 with the second physical quantity determined in FIGS. 5-7. As a position of the camera 3 or an angle at which the camera 3 is mounted is changed due, for example, to the warping of the camera 3, when a difference between the first physical quantity and the second physical quantity is greater than a predetermined error, the processor 100 may determine that there is a need to adjust calibration information.

Figure 8:
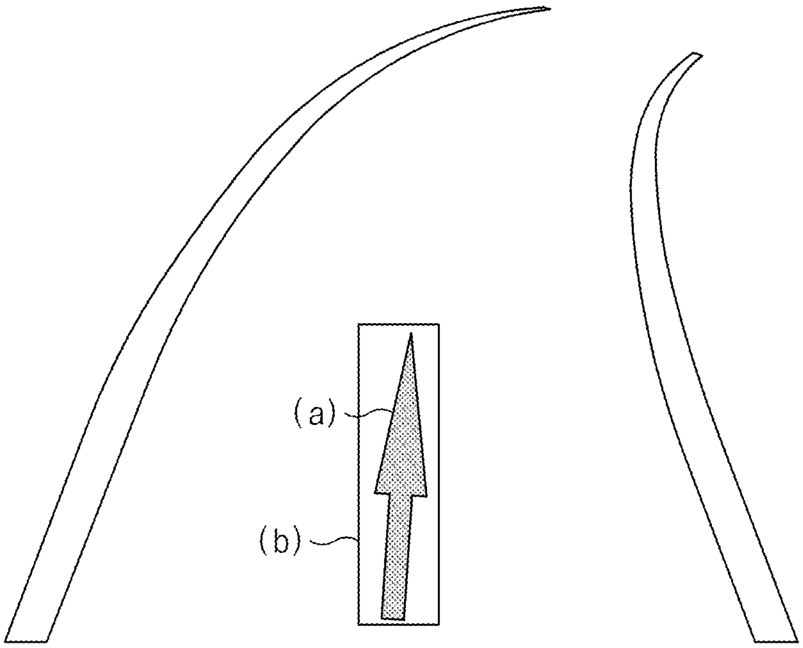
FIG. 8 is a drawing illustrating keypoint information used in an electronic device, according to an embodiment.

FIG. 8 is a drawing illustrating keypoint information used in an electronic device, according to an embodiment.

Referring to FIG. 8, when it is determined that the target 10 analyzed by the autonomous driving deep learning model 2 is a static object, the processor 100 may determine a first physical quantity based on a feature of the static object. For example, when it is determined that the target 10 analyzed by the autonomous driving deep learning model 2 is an object fixed to a road, for example, a road sign, a road marker, and a building, the processor 100 may determine the object as a keypoint and may determine an amount of movement of a host vehicle from the keypoint.

In other words, as shown in FIG. 8, the processor 100 may display a marker a displayed on the road as a bounding box and may determine the bounding box as a keypoint b.

The processor 100 may determine a first physical quantity and a second physical quantity using two different methods. For example, the processor 100 may obtain a movement speed of the electronic device 1 in a host vehicle based on the amount of movement of the keypoint b that has the same index and may determine the movement speed of the host vehicle as the first physical quantity. In other words, because the keypoint has a fixed index on the image and is moved according to the movement of the electronic device 1 in the host vehicle, the processor 100 may calculate an amount of movement based on calibration information and may divide the amount of movement by a movement time of the electronic device 1 to determine the movement speed of the electronic device 1 as the first physical quantity.

Furthermore, the processor 100 may determine the movement speed of the electronic device 1 in the host vehicle, where the movement speed is received by the electronic device 1 through CAN communication, as a second physical quantity.

In an embodiment, when the first physical quantity based on the calibration information and the second physical quantity calculated by the CAN communication are different from each other by a value that is greater than a reference error, the processor 100 may determine that there is a need to adjust the calibration information.

As a result, when the difference between the first physical quantity and the second physical quantity is greater than or equal to a predetermined reference value, the processor 100 may adjust the calibration information. Thus, when the camera 3 is warped, the processor 100 may adjust the calibration information although not performing calibration in a separate place, thus reducing an error in calculation of a distance from the target 10.

Figure 9:
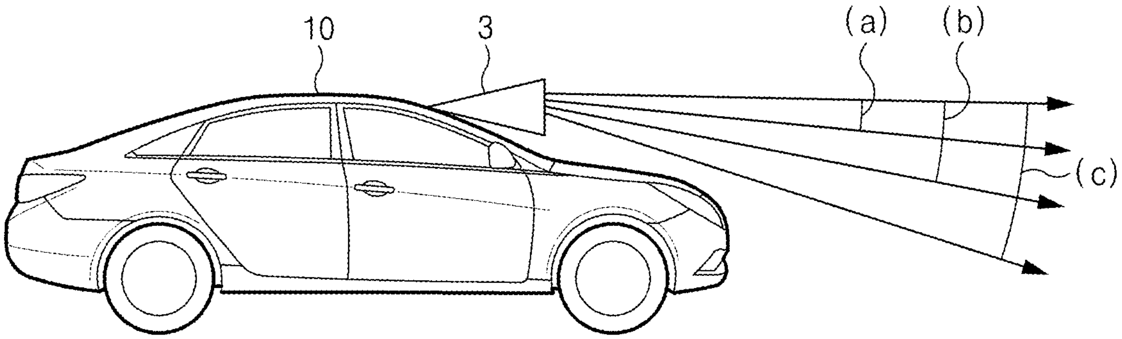
FIG. 9 is a drawing illustrating an example of a calibration error in an electronic device, according to an embodiment.

FIG. 9 is a drawing illustrating an example of a calibration error in an electronic device, according to an embodiment.

Referring to FIG. 9, as described above, when it is determined that the processor 100 should adjust calibration information, the processor 100 may adjust the calibration information to a candidate value for a calibration expected error stored in the memory 110.

For example, the memory 110 may store a rotation/motion transform matrix for converting a world coordinate system into a coordinate system for the camera 3 based on an angle at which the camera 3 is warped. As shown in FIG. 9, the processor 100 may match property values of corresponding rotation/motion transform matrices with a first warped angle a, a second warped angle b, and a third warped angle c. The processor 100 may then adjust calibration information based on the respective property values.

The processor 100 may determine to adjust the calibration information, may select a property value in which an error between a first physical quantity and a second physical quantity is minimized, and may determine the selected property value as the calibration information. Thus, although the error between the first physical quantity and the second physical quantity is generated because the camera 3 is warped, the processor 100 may reduce the error based on the rotation/motion transform matrix, without passing through a separate calibration task, thus improving the accuracy of calculating a distance.

Figure 10:
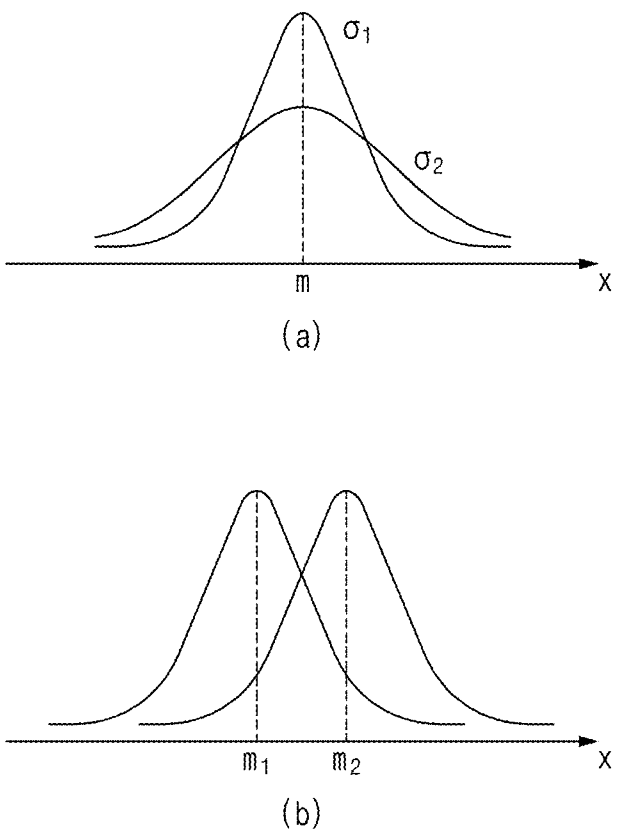
FIG. 10 is a drawing illustrating a normal distribution graph used in an electronic device, according to an embodiment.

FIG. 10 is a drawing illustrating a normal distribution graph used in an electronic device, according to an embodiment.

Referring to FIG. 10, the processor 100 may assume that a physical quantity determined in the process of determining the physical quantity in the plurality of methods which are described above follows a normal distribution. Thus, the electronic device 1 according to an embodiment may estimate a physical quantity based on the normal distribution and may determine whether to adjust calibration information based on determining that the estimated physical quantity is greater than or equal to a predetermined reference value, without determining whether to adjust the calibration information sensitively for each error in a single frame of an image captured by the camera 3. Thus, the electronic device 1 may improve reliability when the electronic device 1 is used in a vehicle to determine whether to adjust the calibration information.

In an embodiment, the processor 100 may determine an average value of first physical quantities and an average value of second physical quantities during a predetermined reference time. The processor 100 may adjust the calibration information when a difference between the average value of the first physical quantities and the average value of the second physical quantities is greater than or equal to a reference value. On the other hand, the processor 100 may fail to adjust the calibration information when the difference between the average value of the first physical quantities and the average value of the second physical quantities is less than the reference value.

In other words, as shown in FIG. 10(*a*), when the average value of the first physical quantities and the average value of the second physical quantities are identical to each other or when an error between the average value of the first physical quantities and the average value of the second physical quantities is less than a predetermined reference error, the processor 100 may transmit control data to the vehicle controller 4 without adjusting the calibration information.

On the other hand, as shown in FIG. 10(*b*), when the error between the average value of the first physical quantities and the average value of the second physical quantities is greater than or equal to the predetermined reference error, the processor 100 may first adjust the calibration information and may transmit control data generated based on the adjusted calibration information to the vehicle controller 4.

Thus, although the camera 3 may be warped by a specific factor, as the calibration information is continuously adjusted, the distance to an external object may be provided at high reliability and safe autonomous driving may be achieved.

Figure 11:
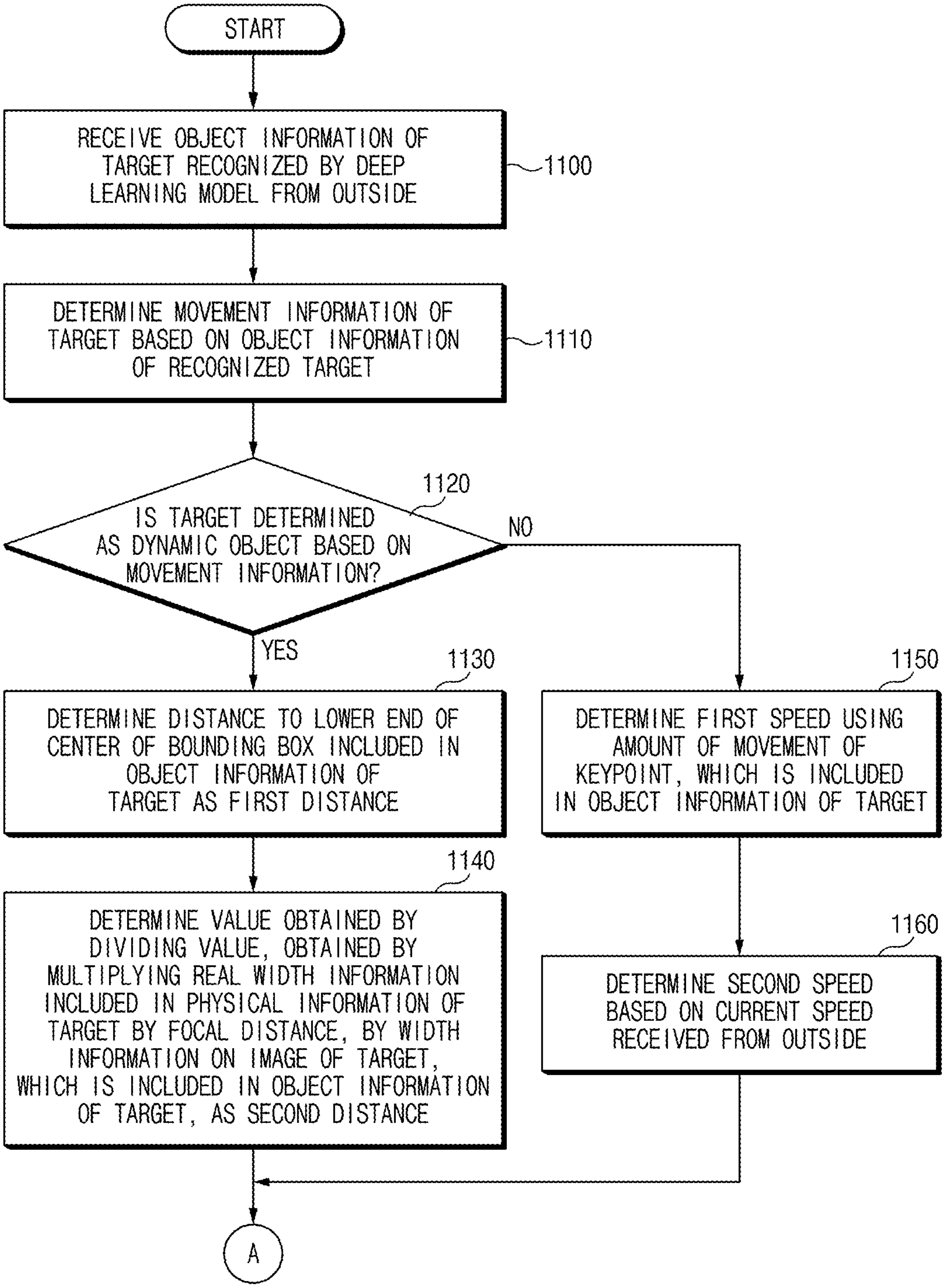
FIG. 11 is a drawing illustrating a control flowchart of an electronic device, according to an embodiment.
Figure 12:
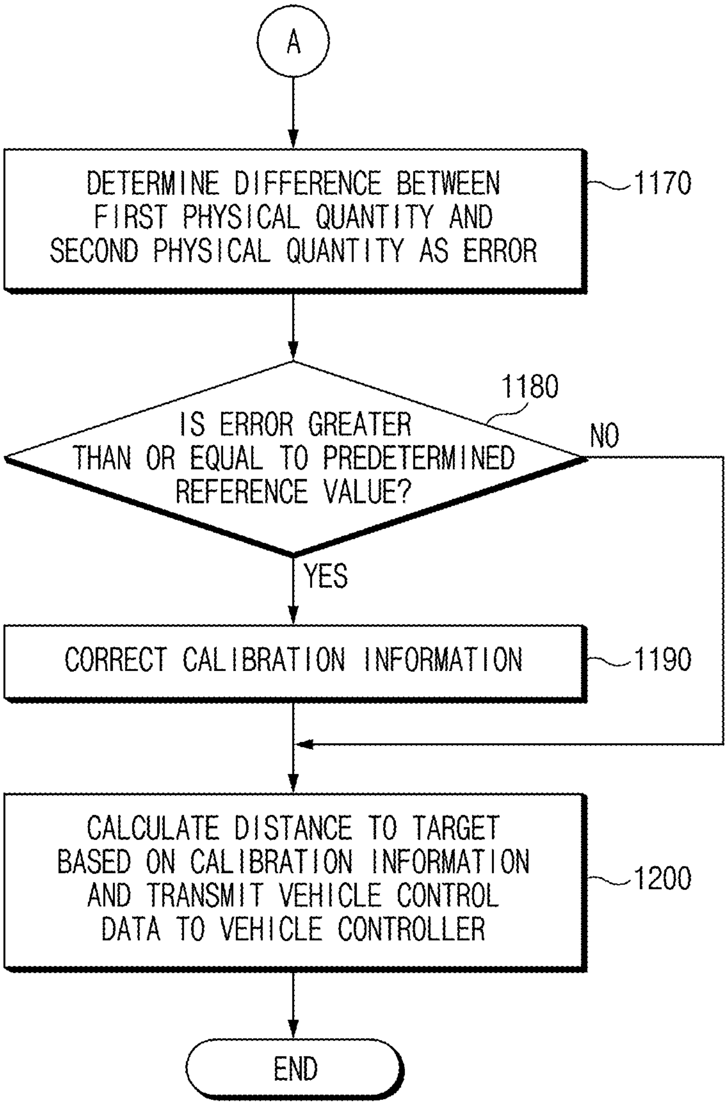
FIG. 12 is a drawing illustrating a control flowchart of an electronic device, which is subsequent to FIG. 11, according to an embodiment.

FIG. 11 is a drawing illustrating a control flowchart of a method performed by an electronic device, according to an embodiment. FIG. 12 is a drawing illustrating a control flowchart of a method performed by the electronic device that is subsequent to FIG. 11, according to an embodiment.

Referring to FIG. 11, in an operation 1100, the electronic device 1 may receive object information of the target 10 recognized by a deep learning model from the outside. I deep learning model may include the autonomous driving deep learning model 2. An entity that provides an image to the autonomous driving deep learning model 2 may include the camera 3.

In an operation 1110, the processor 100 of the electronic device 1 may determine movement information of the recognized target 10 based on the object information of the target 10. In an operation 1120, the processor 100 may determine whether the target 10 is a dynamic object or a static object based on the movement information of the target 10.

When it is determined that the target 10 is the dynamic object based on the movement information (YES in the operation 1120), the method may proceed to an operation 1130. In the operation 1130, the processor 100 may determine a distance from the electronic device 1 to a lower end of the center of a bounding box included in the object information of the target 10 as a first distance. In an embodiment, a first physical quantity and a second physical quantity may include a first distance, a second distance, a first speed, and a second speed.

In operation 1140, the processor 100 may determine a value obtained by dividing i) a value obtained by multiplying actual width information of the target 10, included in physical information of the target 10, by a focal distance of the camera 3 by ii) width information on an image of the target 10, included in the object information of the target 10, as a second distance.

On the other hand, when it is determined that the target 10 is the static object based on the movement information (NO in the operation 1120), the method may proceed to an operation 1150. In the operation 1150, the processor 100 may determine a first speed using the amount of movement of a keypoint included in the object information of the target 10. In an operation 1160, the processor 100 may determine a second speed based on a current speed received from the outside. In other words, the processor 100 may determine a current speed of a host vehicle, where the current speed may be received from a controller of the host vehicle through CAN communication, as the second speed.

Referring to FIG. 12, in an operation 1170, the processor 100 may determine a difference between the first physical quantity and the second physical quantity as an error. In an operation 1180, the processor 100 may determine whether the error is greater than or equal to a predetermined reference value.

When the error between the first physical quantity and the second physical quantity is greater than or equal to the predetermined reference value (YES in the operation 1180), the method may proceed to an operation 1190. In the operation 1190, the processor 100 may adjust calibration information. On the other hand, when the error between the first physical quantity and the second physical quantity is less than the predetermined reference value (NO in the operation 1180, the processor 100 may omit adjusting of the calibration information.

In an operation 1200, the processor 100 may calculate a distance to the target 10 based on the calibration information and may transmit vehicle control data to the vehicle controller 4.

Thus, the electronic device 1 according to an embodiment may obtain the first physical quantity using the calibration information, may obtain the second physical quantity without using the calibration information, may calculate a physical quantity with the same value in different methods, and may identify whether to adjust the calibration information on a periodic basis, thus increasing the accuracy of the process of determining the distance to the target 10.

The disclosed embodiments may be implemented in the form of a storage medium which stores instructions executable by a computer. The instructions may be stored in the form of a program code and may generate a program module and may perform operations of the disclosed embodiments when executed by the processor 100. The storage medium may be implemented as a computer-readable storage medium.

The computer-readable storage media may include various types of storage media that store instructions decoded by the computer. For example, the computer-readable storage media may be a read only memory (ROM), a random access memory (RAM), a magnetic tape, a magnetic disc, a flash memory 110, an optical data storage device, and/or the like.

The computer-readable storage medium may be provided in the form of a non-transitory storage medium. Herein, the term "non-transitory storage medium" simply means that the storage medium is a tangible device and does not include a signal (e.g., an electromagnetic wave). This term does not necessarily differentiate between when data is semi-permanently stored in the storage medium and when data is temporarily stored in the storage medium. For example, the "non-transitory storage medium" may include a buffer in which data is temporarily stored.

According to an embodiment, a method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least a part of the computer program product (e.g., a downloadable app) may be temporarily generated or at least temporarily stored in the machine-readable storage medium, such as a memory 110 of the manufacturer's server, a server of the application store, or a relay server.

According to an embodiment of the present disclosure, an electronic device may obtain 2D bounding box information and keypoint information in an image from a deep learning recognition result. The electronic device may determine and adjust whether the camera is warped or an error occurs in an angle at which the camera is mounted while the vehicle is traveling, thus reducing a time and effort for physically changing the warping of the camera or the angle at which the camera is mounted.

According to an embodiment of the present disclosure, the electronic device may have an effect of filtering sample data with high noise by means of a method for representing sample data as a normal distribution and comparing the sample data with normal distribution-based reference data.

According to an embodiment of the present disclosure, the electronic device may calculate a distance to a target vehicle and a speed of the target vehicle to predict movement of the target vehicle and may automatically recognize and compensate for warping of the camera even when the camera is warped while driving, thus providing an autonomous driving system of the vehicle with accurate and continuous autonomous driving control information.

In the above, specific embodiments are illustrated and described. However, this disclosure is not limited to only the described embodiments. Those having ordinary skill in the art to which the present disclosure pertains should be able to make various changes without departing from the gist of the technical idea of the present disclosure as set forth in the claims below.

What is claimed is:

1. An electronic device, comprising:

a communication device configured to receive object information of a target captured by a camera and recognized based on a deep learning model;

a memory storing calibration information of the camera and physical information of the target; and a processor configured to:

determine movement information of the target based on the object information, determine a first physical quantity to the target based on the movement information and the calibration information;

determine a second physical quantity to the target based on the movement information and the physical information; and compare the first physical quantity with the second physical quantity to determine whether to adjust the calibration information, wherein the processor is configured to:

when the target is determined as a dynamic object based on the movement information;

determine, as the first physical quantity, a first distance to a lower end of a center of a bounding box included in the object information based on the calibration information; and determine, as the second physical quantity, a second distance using a ratio between actual width information of the target, the actual width information being included in the physical information, and width information on an image of the target, the width information being included in the object information, and adjust the calibration information based on a difference between the first physical quantity corresponding to the first distance and the second physical quantity corresponding to the second distance, and wherein the processor is configured to: when the target is determined as a static object based on the movement information, determine, as the first physical quantity, a first speed using an amount of movement of a keypoint included in the object information;

receive a current speed;

determine, as the second physical quantity, a second speed corresponding to the current speed; and adjust the calibration information based on a difference between the first physical quantity corresponding to the first speed and the second physical quantity corresponding to the second speed.

2. The electronic device of claim 1, wherein the processor is configured to divide i) a value obtained by multiplying the actual width information by a focal distance of the camera by ii) the width information on the image to determine the second physical quantity corresponding to the second distance.

3. The electronic device of claim 1, wherein the processor is configured to adjust the calibration information in response to determining that the difference between the first physical quantity corresponding to the first distance and the second physical quantity corresponding to the second distance is greater than or equal to a predetermined reference value.

4. The electronic device of claim 1, wherein the processor is configured to:

determine an average value of a plurality of the first physical quantity corresponding to the first distance and an average value of a plurality of the second physical quantity corresponding to the second distance during a predetermined reference time, and adjust the calibration information in response to determining that a difference between the average value of the plurality of the first physical quantity corresponding to the first distance and the average value of the plurality of the second physical quantity corresponding to the second distance is greater than or equal to a predetermined reference value.

5. A method of controlling an electronic device, the method comprising:

receiving, by a processor, object information of a target captured by a camera and recognized based on a deep learning model;

determining, by the processor, movement information of the target based on the object information;

determining, by the processor, a first physical quantity to the target based on the movement information and calibration information of the target;

determining, by the processor, a second physical quantity to the target based on the movement information and physical information of the target; and comparing, by the processor, the first physical quantity with the second physical quantity to determine whether to adjust the calibration information, wherein the determining of the first physical quantity includes:

when the target is determined as a dynamic object based on the movement information, determining, as the first physical quantity, a first distance to a lower end of a center of a bounding box included in the object information based on the calibration information; and when the target is determined as a static object based on the movement information, determining, as the first physical quantity, a first speed using an amount of movement of a keypoint included in the object information, and wherein the determining of the second physical quantity includes:

when the target is determined as a dynamic object based on the movement information, determining, as the second physical quantity, a second distance using a ratio between actual width information of the target, the actual width information being included in the physical information, and width information on an image of the target, the width information being included in the object information, and when the target is determined as a static object based on the movement information, receiving a current speed through a communication device, and determining, as the second physical quantity, a second speed corresponding to the current speed, wherein determining whether to adjust the calibration information includes:

adjusting the calibration information based on a difference between the first physical quantity corresponding to the first distance and the second physical quantity corresponding to the second distance, and adjusting the calibration information based on a difference between the first physical quantity corresponding to the first speed and the second physical quantity corresponding to the second speed.

6. The method of claim 5, wherein determining the second physical quantity includes:

dividing i) a value obtained by multiplying the actual width information by a focal distance of the camera by ii) the width information on the image to determine the second physical quantity corresponding to the second distance.

7. The method of claim 5, wherein determining whether to adjust the calibration information includes:

adjusting the calibration information based on determining that the difference between the first physical quantity corresponding to the first distance and the second physical quantity corresponding to the second distance is greater than or equal to a predetermined reference value.

8. The method of claim 5, wherein determining whether to adjust the calibration information includes:

determining an average value of a plurality of the first physical quantity corresponding to the first distance and an average value of a plurality of the second physical quantity corresponding to the second distance during a predetermined reference time, and adjusting the calibration information in response to determining that a difference between the average value of plurality of the first physical quantity corresponding to the first distance and the average value of the plurality of the second physical quantity corresponding to the second distance is greater than or equal to a predetermined reference value.

* * * * *